United States Patent
Shiga et al.

(10) Patent No.: US 12,389,357 B2
(45) Date of Patent: Aug. 12, 2025

(54) WIRELESS COMMUNICATION SYSTEM

(71) Applicant: NATIONAL INSTITUTE OF INFORMATION AND COMMUNICATIONS TECHNOLOGY, Koganei (JP)

(72) Inventors: Nobuyasu Shiga, Sunnyvale (CA); Satoshi Yasuda, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 320 days.

(21) Appl. No.: 18/116,491

(22) Filed: Mar. 2, 2023

(65) Prior Publication Data
US 2024/0298284 A1    Sep. 5, 2024

(51) Int. Cl.
*H04W 56/00* (2009.01)
*H04W 4/02* (2018.01)

(52) U.S. Cl.
CPC ..... *H04W 56/0055* (2013.01); *H04W 56/002* (2013.01)

(58) Field of Classification Search
CPC .............................................. H04W 4/00–029
See application file for complete search history.

(56) References Cited

U.S. PATENT DOCUMENTS

| | | | | |
|---|---|---|---|---|
| 2010/0013712 A1* | 1/2010 | Yano | .................... | G01S 13/876 342/463 |
| 2010/0271263 A1* | 10/2010 | Moshfeghi | ............ | A63F 13/235 342/378 |

(Continued)

FOREIGN PATENT DOCUMENTS

JP    2011159034 A    8/2011

OTHER PUBLICATIONS

International Search Report (ISR) dated May 7, 2024, issued in International Application No. PCT/JP204/005097.

(Continued)

*Primary Examiner* — San Htun
(74) *Attorney, Agent, or Firm* — Holtz, Holtz & Volek PC

(57) ABSTRACT

A wireless communication system includes a base station group constituted of four or more base stations 2. One base station 2A measures a reception clock time $T_{AA}$ of a signal transmitted by itself and a reception clock time $T_{BA}$ of a signal received from another base station 2B, and the other base station 2B measures a reception clock time $T_{BB}$ of a signal transmitted by itself and a reception clock time $T_{AB}$ of a signal received from the one base station 2A. Based on the reception clock time $T_{AA}$ and the reception clock time $T_{BA}$ and the reception clock time $T_{BB}$ and the reception clock time $T_{AB}$, a propagation time between the base stations 2 is obtained, and distances between all the base stations 2 are obtained by multiplying each of the propagation times similarly obtained between all the base stations 2 by a propagation velocity of the signals.

5 Claims, 10 Drawing Sheets

(56) References Cited

U.S. PATENT DOCUMENTS

| | | |
|---|---|---|
| 2011/0227826 A1 | 9/2011 | Yamamoto |
| 2018/0233145 A1* | 8/2018 | Bathiche ................ G06V 40/23 |
| 2020/0229124 A1* | 7/2020 | Soriaga ................ H04W 4/023 |
| 2020/0413360 A1* | 12/2020 | Ruffini .............. H04W 56/0015 |
| 2022/0287000 A1* | 9/2022 | Bao .......................... G01S 5/14 |

OTHER PUBLICATIONS

Abe, et al., "Indoor location estimation based on relative distance measurement using radio wave", The 81st national Convention of IPSJ (Information Processing Society of Japan), Best Available Date: 2019.

Panta, et al., "Range Variation Monitoring with Wireless Two-Way Interferometry (Wi-Wi)", arXiv:1806.02130, Oct. 30, 2018, Version 2, V2.

International Search Report (ISR) dated May 7, 2024, issued in International Application No. PCT/JP2024/005097.

Shiga, et al., "Demonstration of wireless two-way interferometry (Wi-Wi)", IEICE Communications Express, vol. 6, No. 2, 77-82, 2017.

\* cited by examiner

FIG. 5
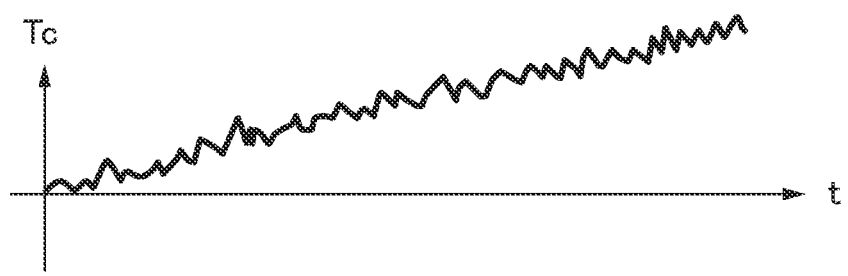
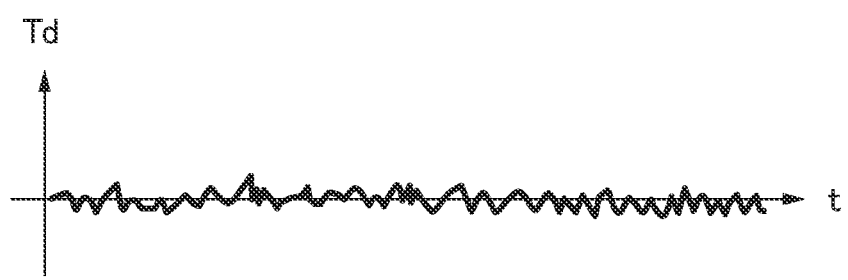

WIRELESS COMMUNICATION SYSTEM

BACKGROUND

1. Technical Field

The present invention relates to a wireless communication system that allows multiple base stations to obtain distances between one another while communicating wirelessly, and is preferable for achieving clock-time synchronization between the multiple base stations using the least amount of radio wave resources.

2. Related Art

In recent years, there has been progress in studies related to Wireless two-way interferometry (Wi-Wi), which is a technique that enables space-time synchronization by allowing wireless communication signals to be transmitted and received bidirectionally between terminals, and measuring a distance and a clock-time difference with high accuracy (for example, see N. Shiga, K. Kido, S. Yasuda, B. Patna, Y. Hanado, S. Kawamura, H. Hanado, K. Takizawa, and M. Inoue, "Demonstration of wireless two-way interferometry (Wi-Wi)," IEICE Communications Express, Vol. 6, No. 2, pp 77-82 (2017)). Since this Wi-Wi is a wireless communication technique, it has a higher scalability of a communication area compared with a wired clock-time synchronization technique, and has an advantage of allowing an initial cost and an operation cost to be low.

Moreover, compared with a case of using a signal of a Global Navigation Satellite System (GNSS) received from a satellite, clock-time synchronization by Wi-Wi can be used even in an environment where the sky cannot be seen, such as indoors or underground, has an excellent accuracy of clock-time synchronization, and also has a further advantage of being capable of flexibly changing a frequency.

While Wi-Wi can provide highly accurate clock-time synchronization through wireless bidirectional communication between two devices, when attempting to simply apply Wi-Wi to clock-time synchronization of multiple devices, the number of receiving devices per channel becomes limited due to the use of radio wave frequency resources. On the other hand, a case of using many frequency channels raises the possibility of causing interference in the wireless signals. Moreover, the case of performing clock-time synchronization between multiple devices by Wi-Wi carries a problem of raising power consumption of an entire system.

The present invention has been made in consideration of the above-described problems. An object of the present invention is to provide a wireless communication system that allows obtaining distances between multiple devices (base stations) using Wi-Wi, and thereby can achieve clock-time synchronization between the multiple base stations using the least amount of radio wave resources.

SUMMARY

A wireless communication system according to a first invention includes a base station group constituted of four or more base stations that allow mutual wireless communication and a distance calculation unit. Between base stations of one base station and another base station constituting the base station group, the one base station measures a reception clock time $T_{AA}$ of a signal transmitted by itself and a reception clock time $T_{BA}$ of a signal received from the other base station, and the other base station measures a reception clock time $T_{BB}$ of a signal transmitted by itself and a reception clock time $T_{AB}$ of a signal received from the one base station, and based on the reception clock time $T_{AA}$ and the reception clock time $T_{BA}$ measured by the one base station and the reception clock time $T_{BB}$ and the reception clock time $T_{AB}$ measured by the other base station, a propagation time between the base stations is obtained. The distance calculation unit obtains distances between all the base stations constituting the base station group by multiplying each of the propagation times similarly obtained between all the base stations by a propagation velocity of the signals.

In a wireless communication system according to a second invention, which is in the first invention, the one base station further measures a reception phase $\varphi_{AA}$ of a signal transmitted by itself and a reception phase $\varphi_{BA}$ of a signal received from another base station, and the other base station further measures a reception phase $\varphi_{BB}$ of a signal transmitted by itself and a reception phase $\varphi_{AB}$ of a signal received from the one base station, and based on the reception phase $\varphi_{AA}$ and the reception phase $\varphi_{BA}$ measured by the one base station and the reception phase $\varphi_{BB}$ and the reception phase $\varphi_{AB}$ measured by the other base station, a propagation time between the base stations is further obtained.

A wireless communication system according to a third invention, which is in the first invention, further includes a coordinate assigning unit that assumes a coordinate of one base station constituting the base station group to be an origin, has the coordinate of the one base station as a reference, and assigns a coordinate of another base station based on the distances between the base stations obtained by the distance calculation unit.

A wireless communication system according to a fourth invention, which is in the third invention, further includes: an absolute coordinate identification unit that identifies absolute coordinates of the respective base stations; and a correction unit that corrects the coordinates of the respective base stations assigned by the coordinate assigning unit based on the absolute coordinates of the respective base stations identified by the absolute coordinate identification unit.

A wireless communication system according to a fifth invention, which is in the first invention, further includes a clock-time synchronization unit that obtains a clock-time difference between the base stations based on the reception clock time $T_{AA}$ and the reception clock time $T_{BA}$ measured by the one base station and the reception clock time $T_{BB}$ and the reception clock time $T_{AB}$ measured by the other base station, and performs clock-time synchronization based on each of the clock-time differences similarly obtained between all the base stations constituting the base station group.

A wireless communication system according to a sixth invention, which is in the third invention, includes: a reception clock time detection unit that detects reception clock times $T_{Ar}$ at which a mobile terminal receives signals transmitted from at least four base stations constituting the base station group; a propagation time calculation unit that performs obtaining a propagation time $T_{dAr}$ of the signal based on a transmission clock time $T_{AA}$ of the signal from each of the base stations and the reception clock time $T_{Ar}$ of the signal detected by the reception clock time detection unit for each of the base stations; and a positioning unit that obtains a location of the mobile terminal and a time error $\Delta T$ based on the propagation time calculated for each of the base stations by the propagation time calculation unit and the coordinates of the respective base stations assigned by the coordinate assigning unit.

A wireless communication system according to a seventh invention, which is in the sixth invention, further includes a clock-time synchronization unit that performs clock-time synchronization between the respective base stations and a mobile terminal based on the time error ΔT obtained by the positioning unit.

With the present invention having the above-described configuration, by obtaining distances between multiple devices (base stations) using Wi-Wi, clock-time synchronization between the multiple base stations using the least amount of radio wave frequency resources can be achieved. Consequently, clock-time synchronization and relative position measurement can be achieved also in a mobile terminal itself just by receiving signals from the base stations. At this point, regardless of the number of the mobile terminals, the clock-time synchronization and the relative position measurement can be achieved just by receiving the signal broadcasted from the base stations. As a result, the clock-time synchronization and the relative position measurement can be achieved without special consideration of an interference between the mobile terminals themselves, and moreover, since this can be achieved without a signal being transmitted from the mobile terminal side, power consumption of an entire system can be reduced.

BRIEF DESCRIPTION OF THE DRAWINGS

FIG. 5 is charts indicating time-sequential changes of a clock-time difference and a propagation time;

DETAILED DESCRIPTION

The following describes a wireless communication system to which the present invention is applied in detail.

Figure 1:
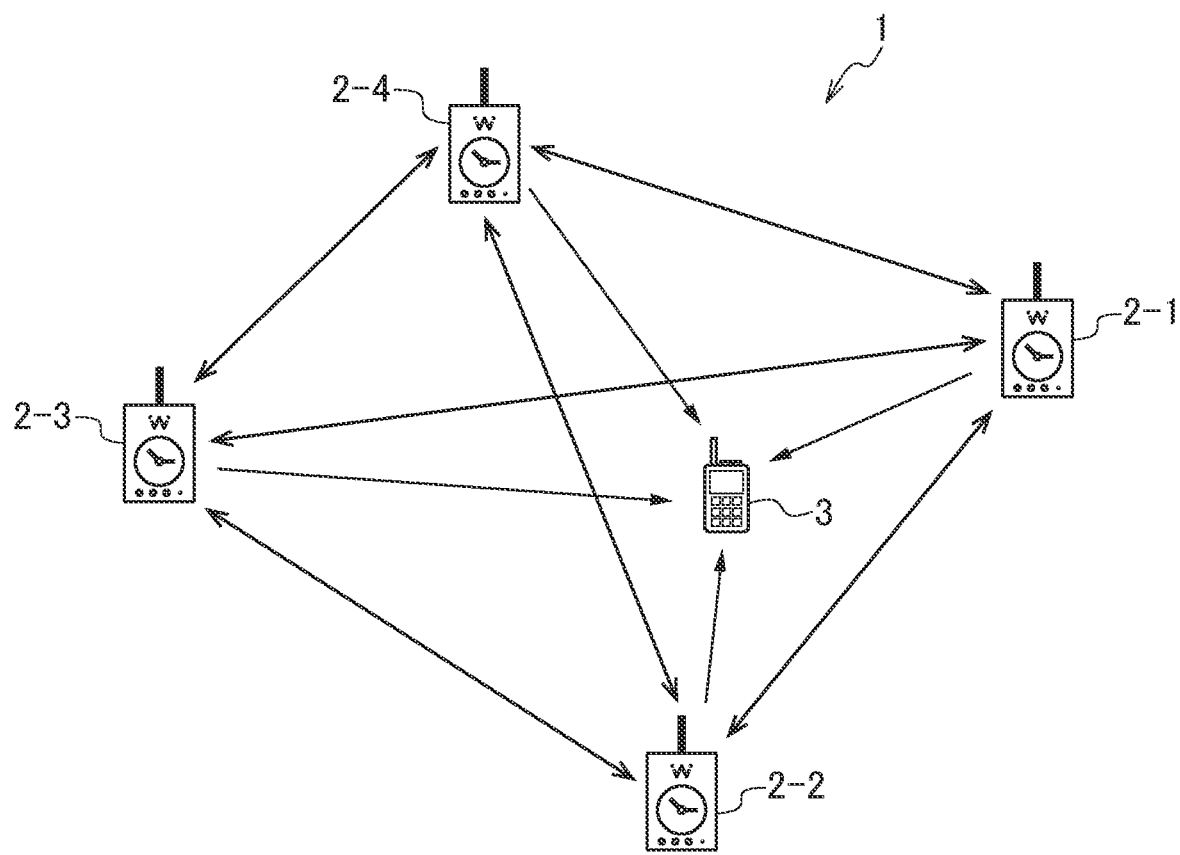
FIG. 1 is a diagram indicating an overall configuration of a wireless communication system to which the present invention is applied.

FIG. 1 indicates an overall configuration of a wireless communication system 1 to which the present invention is applied. The wireless communication system 1 is configured of a base station group constituted of four or more base stations 2 and one or more mobile terminal 3. In the following example, a description will be given using an example in which the wireless communication system 1 is configured of four base stations 2-1, 2-2, 2-3, 2-4.

The base station 2 is configured as a mobile type or a fixed type. The mobile terminal 3 is configured as a mobile type. The base station 2 and the mobile terminal 3 may be embodied as a terminal device capable of wireless communication, such as a mobile phone, a smart phone, a tablet terminal, a wearable device, or a laptop-type personal computer (PC).

Figure 2:
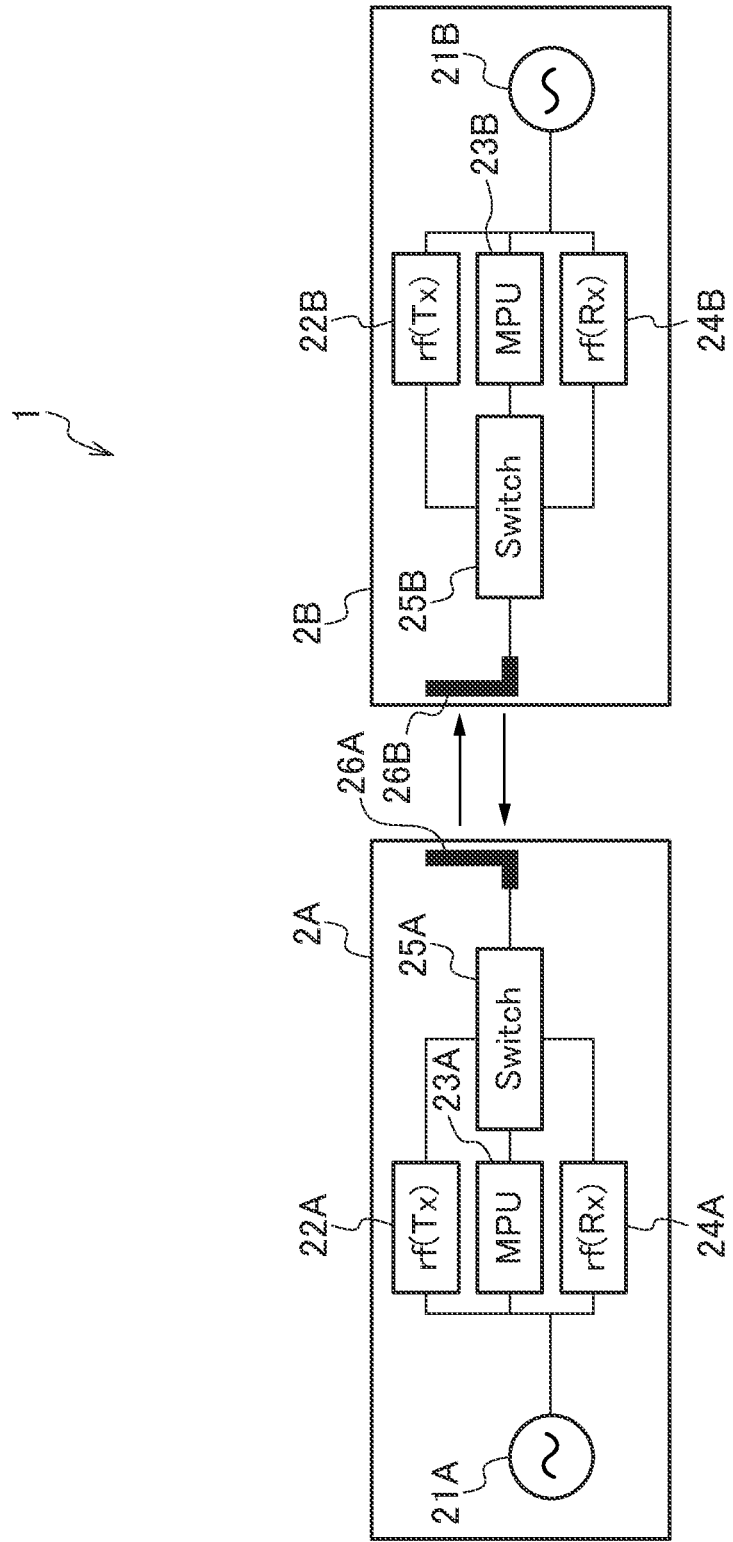
FIG. 2 is a block configuration diagram of respective base stations.
Figure 3:
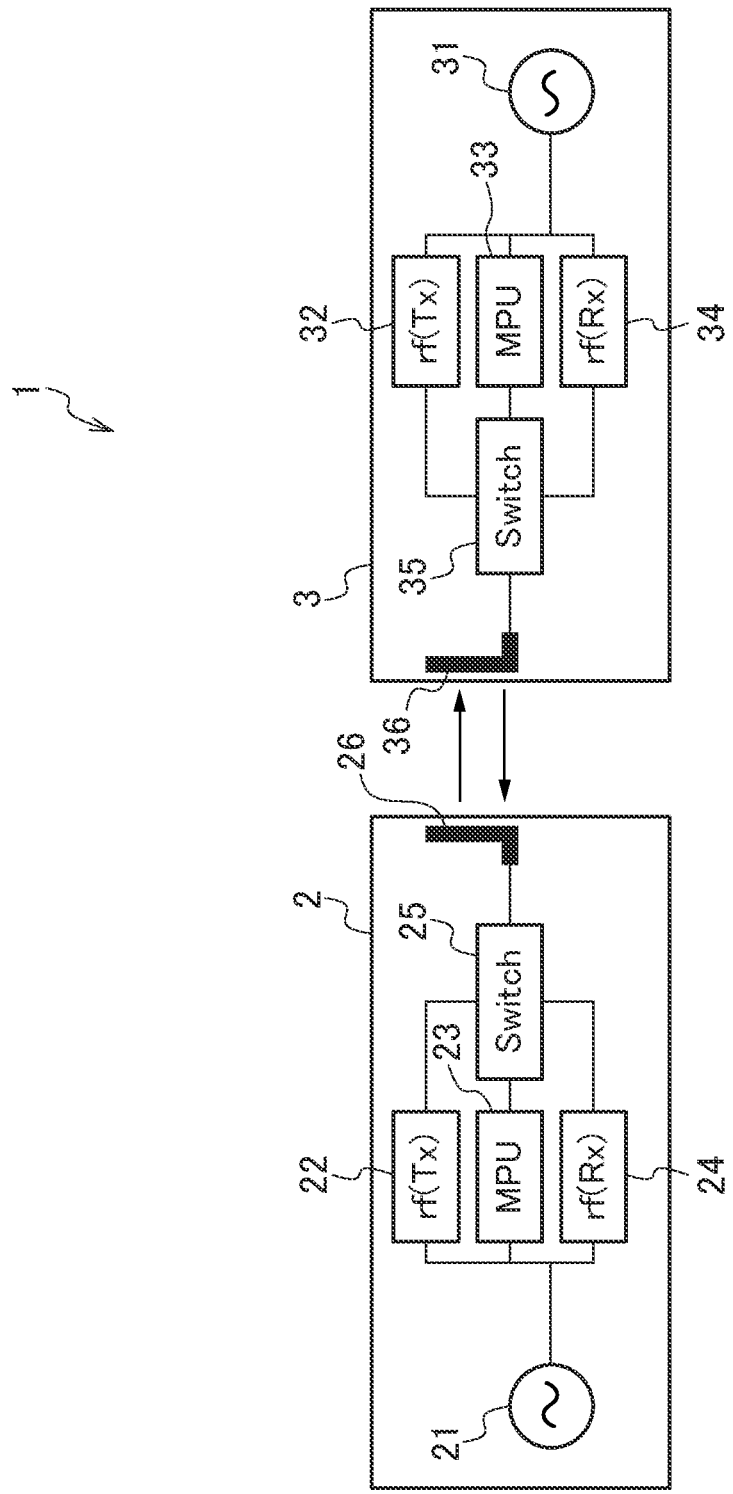
FIG. 3 is a block configuration diagram of a base station and a mobile terminal.

FIG. 2 is a block configuration diagram of respective base stations 2A, 2B in a case where wireless communication is performed between the two base stations 2, and FIG. 3 is a block configuration diagram of the base station 2 and the mobile terminal 3 in a case where wireless communication is performed between one of the base stations 2 and the mobile terminal 3. Note that, as the base stations 2A, 2B, arbitrary two base stations 2 that mutually communicate wirelessly among the above-described four base stations 2-1, 2-2, 2-3, 2-4 are applied as examples.

The base station 2A includes: an oscillator 21A; a transmitting unit 22A, a control unit 23A, and a receiving unit 24A connected to this oscillator 21A; a switch 25A connected to these transmitting unit 22A, control unit 23A, and receiving unit 24A; and a communication interface 26A connected to the switch 25A.

The base station 2B includes: an oscillator 21B; a transmitting unit 22B, a control unit 23B, and a receiving unit 24B connected to this oscillator 21B; a switch 25B connected to these transmitting unit 22B, control unit 23B, receiving unit 24B; and a communication interface 26B connected to the switch 25B.

Similarly, the mobile terminal 3 includes: an oscillator 31; a transmitting unit 32, a control unit 33, and a receiving unit 34 connected to this oscillator 31; a switch 35 connected to these transmitting unit 32, control unit 33, and receiving unit 34; and a communication interface 36 connected to the switch 35. Note that, the configuration of the transmitting unit 32 may be omitted.

The oscillator 21A (21B) operates under control of the control unit 23A (23B), generates an electric signal of an alternating-current waveform transmitted based on clock-time information set in itself, and supplies this to the transmitting unit 22A (22B). The oscillator 21A (21B) may be given a function of adjusting a frequency based on control information supplied from the control unit 23A (23B). The oscillator 21A (21B) also plays a role of providing clock-time information and the like required for measuring a phase regarding a signal received in the receiving unit 24A (24B).

The transmitting unit 22A (22B) performs a superimposition process, various modulation processes, filtering, and the like of an intermediate frequency required for transmission by radio wave regarding the signal supplied from the oscillator 21A (21B).

The control unit 23A (23B) plays a role as a central control unit for controlling the entire base station 2, and is constituted of a Micro Processor Unit (MPU), for example. This control unit 23A (23B) controls various processes required for space-time synchronization, such as measurement of a reception clock time and a reception phase, calculations of a clock-time difference and a propagation time between the base station 2A (2B) and another base station 2 or between the base station 2A (2B) and the mobile terminal 3, and clock-time synchronization based on a feed back to the frequency of the oscillator 21A (21B) described later. Space-time synchronization here refers to measurement of the clock-time difference and measurement of a communication propagation time.

The receiving unit 24A (24B) performs various demodulation processes, filtering, and the like of a signal received via the communication interface 26A (26B) or a signal received from the transmitting unit 22A (22B) via the switch 25A (25B).

Under control of the control unit 23A (23B), the switch 25A (25B) switches between a connection of the transmitting unit 22A (22B) to the communication interface 26A (26B) and a connection of the receiving unit 24A (24B) to the communication interface 26A (26B). In such case, the switch 25A (25B) controls such that the transmitting unit 22A (22B) is connected to the communication interface 26A (26B) when transmitting a signal, and controls such that the receiving unit 24A (24B) is connected to the communication interface 26A (26B) when receiving a signal. At this point, the switch 25A (25B) may perform a setting such that, when the transmitting unit 22A (22B) is connected to the communication interface 26A (26B) upon transmission of a signal, the signal transmitted from this transmitting unit 22A (22B) can be received in the receiving unit 24A (24B).

The communication interface 26A (26B) is configured of an antenna for converting a signal transmitted via the switch 25A (25B) into a radio wave, and converting a radio wave transmitted from the mobile terminal 3 on the counterpart side into an electric signal.

It is a prerequisite for the mobile terminal 3 that performs wireless communication with the base stations 2 having the above-described configuration to be equipped with similar configuration components. The oscillator 31 indicated in FIG. 3 operates under control of the control unit 33, generates an electric signal of an alternating-current waveform transmitted based on clock-time information set in itself, and supplies this to the transmitting unit 32. The oscillator 31 may be given a function of adjusting a frequency based on control information supplied from the control unit 33. The oscillator 31 also plays a role of providing clock-time information and the like required for measuring a phase regarding a signal received in the receiving unit 34.

The transmitting unit 32 performs a superimposition process, various modulation processes, filtering and the like of an intermediate frequency required for transmission by radio wave regarding the signal supplied from the oscillator 31.

The control unit 33 plays a role as a central control unit for controlling the entire mobile terminal 3, and is configured of a Micro Processor Unit (MPU), for example. This control unit 33 controls various processes required for space-time synchronization, such as measurement of a reception clock time and a reception phase, calculations of clock-time differences and propagation times between the mobile terminal 3 and the base stations 2, and clock-time synchronization based on a feed back to the frequency of the oscillator 31 described later.

The receiving unit 34 performs various demodulation processes, filtering, and the like regarding a signal received via the communication interface 36 or a signal received from the transmitting unit 32 via the switch 35.

Under control of the control unit 33, the switch 35 switches between a connection of the transmitting unit 32 to the communication interface 36 and a connection of the receiving unit 34 to the communication interface 36. In such case, the switch 35 controls such that the transmitting unit 32 is connected to the communication interface 36 when transmitting a signal, and controls such that the receiving unit 34 is connected to the communication interface 36 when receiving a signal. At this point, the switch 35 may perform a setting such that, when the transmitting unit 32 is connected to the communication interface 36 upon transmission of a signal, the signal transmitted from this transmitting unit 32 can be received in the receiving unit 34.

The communication interface 36 is configured of an antenna for converting a signal transmitted via the switch 35 into a radio wave, and converting a radio wave transmitted from the base stations 2 on the counterpart side into an electric signal.

Next, an operation of the wireless communication system 1 having the above-described configuration will be described. Space-time synchronization communication is mutually performed between the base stations 2, and between the base stations 2 and the mobile terminal 3 constituting the wireless communication system 1. Space-time synchronization means a state where clock-time synchronization is performed locally between the base stations 2, and between the base stations 2 and the mobile terminal 3, and they are mutually aware of their locations. That is, it refers to a state where a single clock is shared between the base stations 2 and between the base stations 2 and the mobile terminal 3 even when they are distant from one another. In particular, the present invention uses the technique of Wireless two-way interferometry (Wi-Wi) to measure a clock-time difference between the oscillators 21A, 21B or a clock-time difference between an oscillator 21 and the oscillator 31, which is between the base stations 2 and between the base stations 2 and the mobile terminal 3, and a propagation time of signals transmitted between one another with an accuracy at a picosecond level. Subsequently, based on the measured results, clock-time synchronization is performed between the base stations 2 and between the base stations 2 and the mobile terminal 3. At this point, distances between the base stations 2 and between the base stations 2 and the mobile terminal 3 can also be measured at a millimeter level based on the measured clock-time differences, clock-phase differences, propagation times, and propagation phases.

In the present invention, propagation times between the base stations 2 of the four or more base stations 2 constituting the wireless communication system 1 are obtained. A method for obtaining a propagation time between two arbitrary base stations 2A, 2B that mutually communicate wirelessly among the exemplified four base stations 2-1, 2-2, 2-3, 2-4 will be described.

Figure 4:
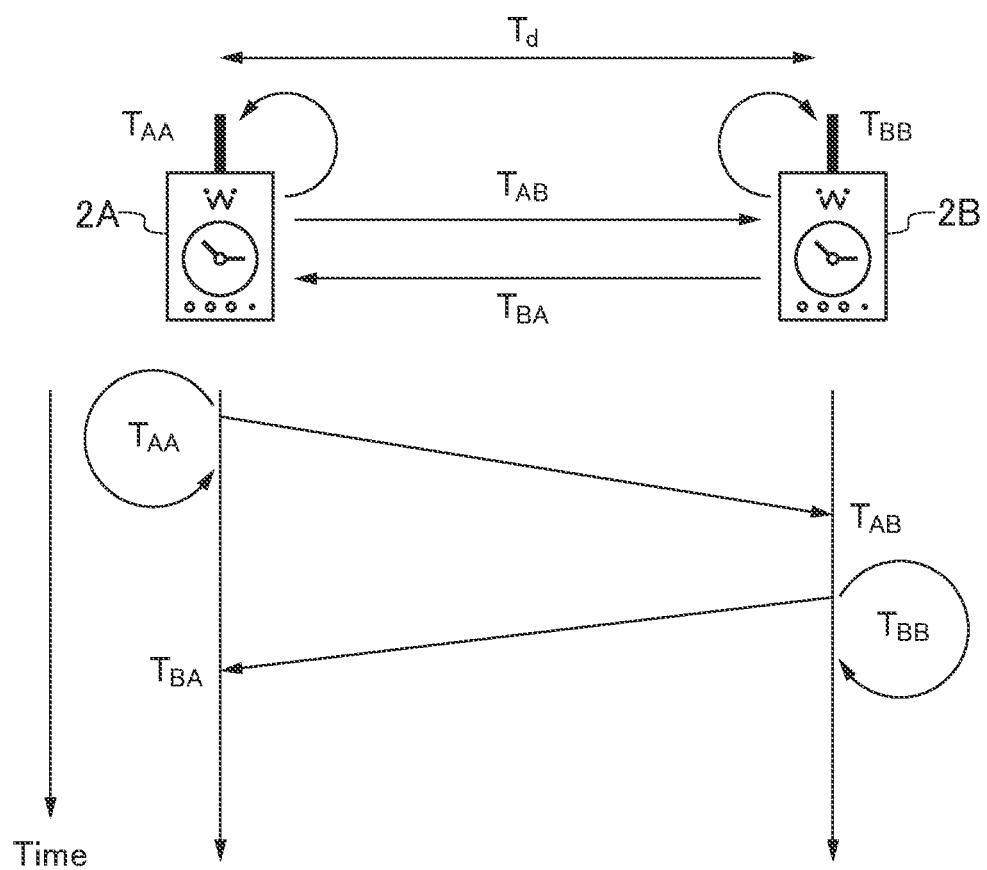
FIG. 4 is a diagram for describing reception clock time obtained between two base stations.

First, the base stations 2A, 2B each transmit a signal to the counterpart side at least once when attempting space-time synchronization. Subsequently, the base stations 2A, 2B each measure the reception clock times of the received signals. Here, in the case where the base stations 2A, 2B each transmit and receive signals, the measured reception clock times of the signals can be classified into four types as indicated in FIG. 4. Regarding signals received in the receiving unit 24A of the base station 2A, there are a reception clock time $T_{AA}$ of a signal that is first transmitted by the base station 2A itself from the transmitting unit 22A and received in the receiving unit 24A, and a reception clock time $T_{BA}$ of a signal transmitted by the transmitting unit 22B of the base station 2B. Regarding signals received in the receiving unit 24B of the base station 2B, there are a reception clock time $T_{BB}$ of a signal that is first transmitted by the base station 2B itself from the transmitting unit 22B and received in the receiving unit 24B, and a reception clock time $T_{AB}$ of a signal transmitted by the transmitting unit 22A of the base station 2A. Note that, as a notation method of a reception clock time $T_{xy}$, x indicates the source of the signal and y indicates the receiving end.

When performing space-time synchronization, the base stations 2A, 2B each report the measured reception clock times to the counterpart side. That is, the base station 2A reports the reception clock time $T_{AA}$ and the reception clock time $T_{BA}$ measured by itself to the base station 2B, and the base station 2B reports the reception clock time $T_{BB}$ and the reception clock time $T_{AB}$ measured by itself to the base station 2A. As a result, the base stations 2A, 2B enter a state where they are able to share the reception clock time $T_{AA}$, the reception clock time $T_{BA}$, the reception clock time $T_{BB}$, and the reception clock time $T_{AB}$ as the reception clock times that have been measured by themselves or have been reported from the counterpart side.

Subsequently, the base stations 2A, 2B obtain a clock-time difference and propagation time based on the following formulae (1) to (4) based on the mutually shared reception clock times ($T_{AA}$, $T_{BA}$, $T_{BB}$, $T_{AB}$).

$$T_A = T_{AB} - T_{AA} \tag{1}$$

$$T_B = T_{BA} - T_{BB} \tag{2}$$

$$T_{c(AB)} = (T_A - T_B)/2 \tag{3) clock-time difference}$$

$$T_{d(AB)} = (T_A + T_B)/2 \tag{4) propagation time}$$

FIG. 5 indicates time-sequential changes of this clock-time difference $T_c$ and propagation time $T_d$. Originally, the respective reception clock times ($T_{AA}$, $T_{BA}$, $T_{BB}$, $T_{AB}$) include clock times of the clock-time difference and clock times of the propagation time between the base stations 2A, 2B. Therefore, by substituting the reception clock times ($T_{AA}$, $T_{BA}$, $T_{BB}$, $T_{AB}$) shared bidirectionally between the base stations 2A, 2B into the above-described formulae, the clock-time difference and propagation time can be shared.

Note that, the propagation time between the two base stations 2A, 2B can be calculated based on not only the reception clock time but also a reception phase described in the following.

Figure 6:
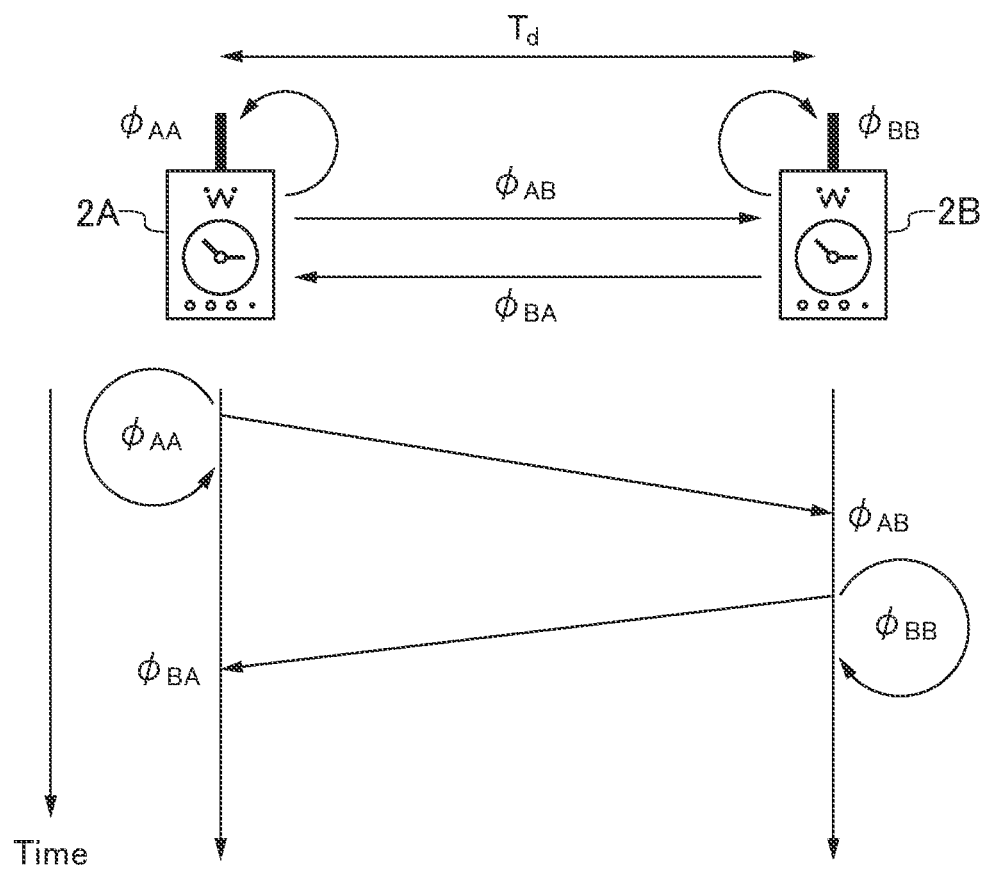
FIG. 6 is a diagram for describing reception phases obtained between the two base stations.

The base stations 2A, 2B each measure the reception phases of the received signals. Here, in the case where the base stations 2A, 2B each transmit and receive signals, the measured reception phases of the signals can be classified into four types as indicated in FIG. 6. Regarding the signals received in the receiving unit 24A of the base station 2A, there are a reception phase $\varphi_{AA}$ of the signal that is first transmitted by the base station 2A itself from the transmitting unit 22A and received in the receiving unit 24A, and a reception phase $\varphi_{BA}$ of the signal transmitted by the transmitting unit 22B of the base station 2B. Regarding the signals received in the receiving unit 24B of the base station 2B, there are a reception phase $\varphi_{BB}$ of the signal that is first transmitted by the base station 2B itself from the transmitting unit 22B and received in the receiving unit 24B, and a reception phase $\varphi_{AB}$ of the signal transmitted by the transmitting unit 22A of the base station 2A. Note that, as a notation method of a reception phase $\varphi_{xy}$, x indicates the source of the signal, and y indicates the receiving end.

When performing space-time synchronization, the base stations 2A, 2B each report the measured reception phases to the counterpart side. That is, the base station 2A reports the reception phase $\varphi_{AA}$ and the reception phase $\varphi_{BA}$ measured by itself to the base station 2B, and the base station 2B reports the reception phase $\varphi_{BB}$ and the reception phase $\varphi_{AB}$ measured by itself to the base station 2A. As a result, the base stations 2A, 2B enter a state where they are able to share the reception phase $\varphi_{AA}$, the reception phase $\varphi_{BA}$, the reception phase $\varphi_{BB}$, and the reception phase $\varphi_{AB}$ as the reception phases that have been measured by themselves or have been reported from the counterpart side.

Next, the base stations 2A, 2B obtain a clock-time difference phase and a propagation phase based on the following formulae (5) to (8) based on the mutually shared reception phases ($\varphi_{AA}$, $\varphi_{BA}$, $\varphi_{BB}$, $\varphi_{AB}$).

$$\varphi_B = \varphi_{AB} - \varphi_{AA} \tag{5}$$

$$\varphi_A = \varphi_{BA} - \varphi_{BB} \tag{6}$$

$$\varphi_{c(AB)} = (\varphi_B - \varphi_A)/2 \tag{7) clock-time difference phase}$$

$$\varphi_{d(AB)} = (\varphi_B + \varphi_A)/2 \tag{8) propagation phase}$$

$$T_{c(AB)} = T_p/2 \times \{N_c + \varphi_{c(AB)}/\pi\} \tag{8.2) clock-time difference}$$

$$T_{d(AB)} = T_p/2 \times \{N_d + \varphi_{c(AB)}/\pi\} \tag{8.3) propagation time}$$

$T_p$ is a time period of one cycle of a carrier wave. $N_c$, $N_d$ are natural numbers obtained from the formulae (3), (4). That is, the approximate clock-time difference and propagation time are measured from the reception clock times, and measurement values more specific than a half cycle can be obtained by the phases.

Figure 7:
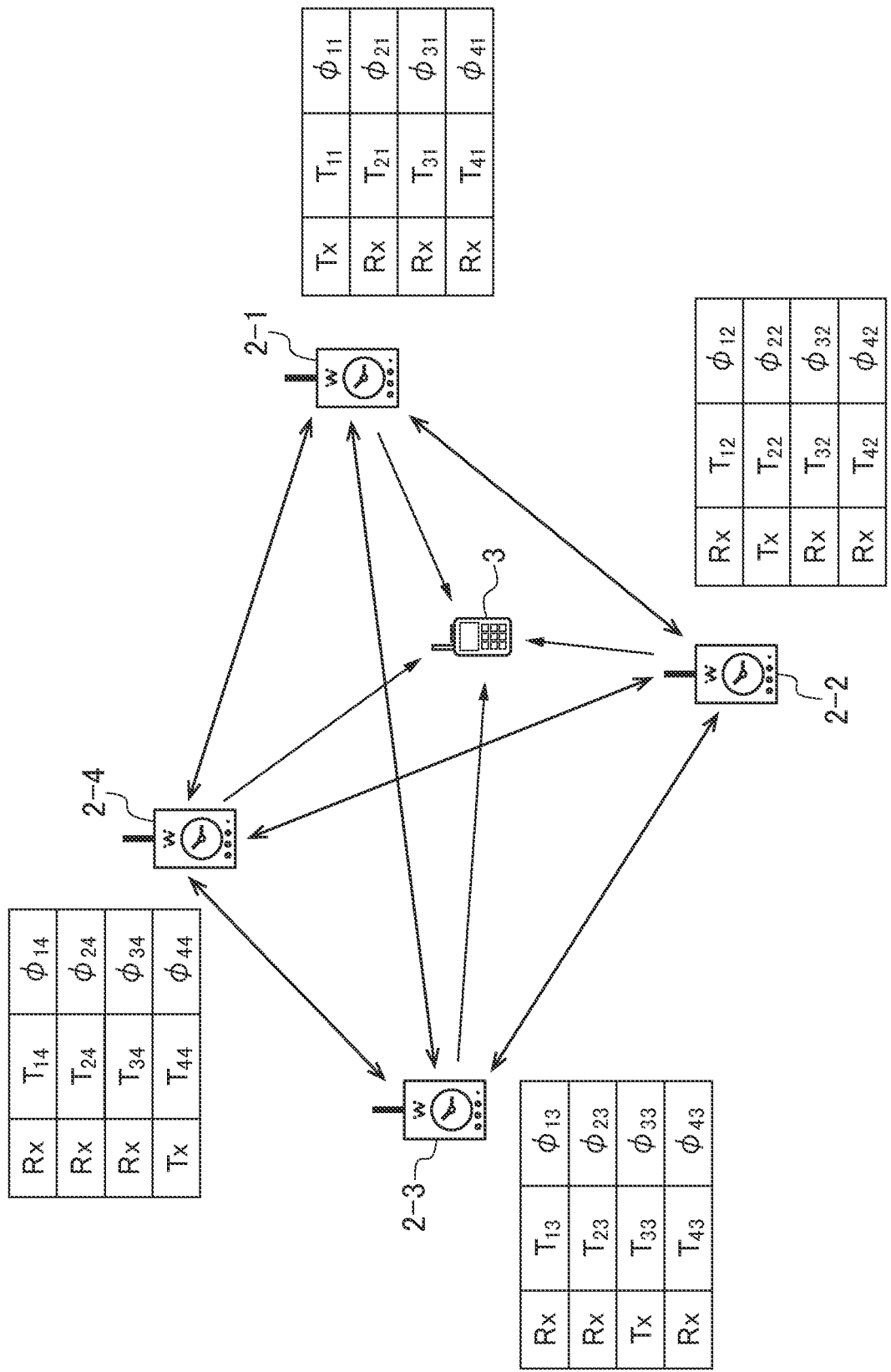
FIG. 7 is a diagram indicating the reception clock time and the reception phases obtained in each of the respective base stations.

Based on the above-described method, the base stations 2-1, 2-2, 2-3, 2-4 obtain the propagation times between the base stations 2. In such case, the above-described reception clock times ($T_{AA}$, $T_{BA}$, $T_{BB}$, $T_{AB}$) or the reception phases ($\varphi_{AA}$, $\varphi_{BA}$, $\varphi_{BB}$, $\varphi_{AB}$) are obtained first. FIG. 7 indicates the reception clock times and reception phases obtained for each of these respective base stations 2-1, 2-2, 2-3, 2-4. The x of the reception clock time $T_{xy}$ and $\varphi_{xy}$ indicates the source of the signal and the y indicates the recipient. The "1" of the x, y indicates the base station 2-1 and the "2" indicates the base station 2-2, the "3" indicates the base station 2-3, and the "4" indicates the base station 2-4. Thus, for example, a reception clock time $T_{12}$ means a reception clock time of a signal transmitted by the base station 2-1 and received by the base station 2-2, and a reception phase $\varphi_{43}$ means a reception phase of a signal transmitted by the base station 2-4 and received by the base station 2-3. In FIG. 7, Tx means a signal that is transmitted by the base station 2 itself and received by itself, and Rx means a signal transmitted from another base station 2 and received by the base station 2 itself.

Provisionally, when focusing on the base station 2-1, reception clock times ($T_{11}$, $T_{21}$, $T_{31}$, $T_{41}$) or reception phases ($\varphi_{11}$, $\varphi_{21}$, $\varphi_{31}$, $\varphi_{41}$) of the four signals received on the base station 2 side can be obtained. Similarly, the other base stations 2-2, 2-3, 2-4 can also obtain the reception clock times and reception phases of the four signals that they have received.

As a result, a total of 16 of each of the reception clock time and the reception phase regarding the base stations 2-1 to 2-4 are obtained.

Based on these reception clock times or reception phases of the base stations 2-1 to 2-4, the propagation times $T_{d(AB)}$ can be obtained. That is, a propagation time $T_{d12}$ between the base station 2-1 and the base station 2-2, a propagation time $T_{d13}$ between the base station 2-1 and the base station 2-3, a propagation time $T_{d14}$ between the base station 2-1 and the base station 2-4, a propagation time $T_{d23}$ between the base station 2-2 and the base station 2-3, a propagation time $T_{d24}$ between the base station 2-2 and the base station 2-4, and a propagation time $T_{d34}$ between the base station 2-3 and the base station 2-4 can be obtained.

After the propagation times $T_{d(AB)}$ between the four base stations 2-1 to 2-4 have been obtained thus, by multiplying these by a propagation velocity of the signals, distances between the base stations 2-1 to 2-4 can be obtained. Provisionally, when the wireless communication is performed as optical communication, the propagation time $T_{d(AB)}$ can be multiplied by the velocity of light c as the propagation velocity to obtain the distance according to: the distance=c×$T_{d(AB)}$.

Thus, the distances between the base stations 2-1 to 2-4 can be obtained. As a basis for this distance calculation, since the propagation times $T_{d(AB)}$ of the signals can be measured with an accuracy at a picosecond level using the above-described Wi-Wi, the distances between the base stations 2-1 to 2-4 can also be measured with an accuracy at a millimeter level. In particular, the measurement accuracy of the propagation time and the clock-time difference can be further enhanced by measuring the propagation phase of a plurality of carrier wave frequencies.

In particular, by calculating the propagation times $T_{d(AB)}$ of the signals based on not only the reception clock times but also the reception phases q, or by calculating the propagation times $T_{d(AB)}$ based on the reception phases as an alternative to the reception clock time, the measurement accuracy of the distances between the base stations 2-1 to 2-4 can be further improved.

Note that, the base stations 2-1 to 2-4 may repeatedly perform such distance measurement of one another. For example, in a case where the base stations 2-1 to 2-4 are configured as mobile bodies, since their locations may change at any time, by repeatedly performing such distance measurement in time sequence, the respective distance changes can be detected in real time.

Figure 8:
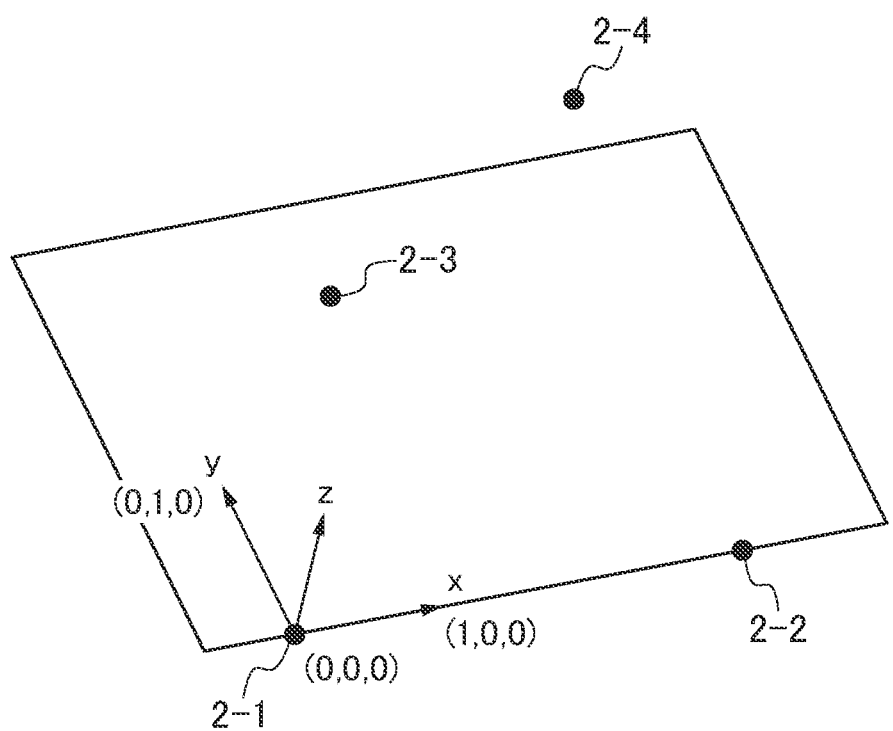
FIG. 8 is a diagram for describing an example of defining a coordinate system between the base stations.

After the distances between the base stations 2-1 to 2-4 have been obtained thus, a coordinate system may be additionally defined between these base stations 2-1 to 2-4. In such case, when assuming that the four base stations 2-1 to 2-4 are not on the same planar surface, as indicated in FIG. 8, an arrangement method of a tetrahedron constituted by the four base stations 2-1 to 2-4 is uniquely determined once the coordinates of the four base stations 2-1 to 2-4 are determined. First, a coordinate of one base station 2 constituting the base station group is assumed to be the origin. For example, the origin (0, 0, 0) is assumed to be on an x, y, z three-dimensional coordinate system of the base station 2-1. Next, a direction to the remaining base station 2-2 is assumed to be the x-axis, and the coordinate of the base station 2-2 is defined based on a distance between the base station 2-1 and base station 2-2 in the x-direction. Next, a surface including the base station 2-3 in addition to the base stations 2-1, 2-2 is defined as an x-y planar surface. In addition, a side including the base station 2-4 when viewed from this x-y planar surface is defined as a positive direction of the z-axis. Based on the x, y, z directions defined thus and the obtained distances, the coordinate systems of the remaining base stations 2-3, 2-4 can be defined.

At this point, absolute coordinates based on signals of the Global Navigation Satellite System (GNSS) received from a satellite may be associated with the coordinates of the respective base stations 2-1 to 2-4. In such case, each of the absolute coordinates is identified based on the GNSS signals that have been received from the satellite by the respective base stations 2-1 to 2-4. Subsequently, together with associating the identified absolute coordinates of the respective base stations 2-1 to 2-4, the calculated distances and coordinates obtained between the base stations 2-1 to 2-4 may be corrected based on the absolute coordinates. The distances obtained between the identified absolute coordinates of the base stations 2-1 to 2-4 may be compared with the distances and coordinates obtained from the propagation times $T_{d(AB)}$ based on the above-described Wi-Wi, and a correction may be performed in a well-known method. Such correction is similarly applicable to a case where the propagation times $T_{d(AB)}$ are obtained based on either of the reception clock times or the reception phases. This obtaining of the absolute coordinate is not limited to a case using the above-described GNSS signal, and an absolute coordinate determined by the Geospatial Information Authority of Japan may be obtained in advance, for example.

The clock-time differences between the base stations 2-1 to 2-4 may be obtained based on the above-described formula (3). After the clock-time differences between all the base stations 2 constituting the base station group have been obtained, clock-time synchronization may be performed between one another. A method for this clock-time synchronization may be based on any well-known method. For example, with respect to any base station 2 that may serve as a master among the base stations 2-1 to 2-4, the remaining other base stations 2 may adjust their clock time to the master base station 2, or an average of the clock-time differences may be obtained and all the base stations 2-1 to 2-4 may adjust to that. Such clock-time synchronization is also similarly applicable to a case where the propagation times $T_{d(AB)}$ are obtained based on either the reception clock times or the reception phases.

In addition, in the present invention, a location and a time error ΔT of the mobile terminal 3 may be obtained based on the distances and the coordinate systems between the base stations 2-1 to 2-4 obtained thus.

In such case, transmission clock times $T_{AA}$ of the signals by the base stations 2-1 to 2-4 are detected. That is, transmission clock times $T_{11}$, $T_{22}$, $T_{33}$, $T_{44}$ of the signals from the base stations 2-1 to 2-4 to the mobile terminal 3 are obtained. A transmission phase $\varphi_{AA}$ may also be obtained similarly, and transmission phases $\varphi_{11}$, $\varphi_{22}$, $\varphi_{33}$, $\varphi_{44}$ of the signals from the base stations 2-1 to 2-4 to the mobile terminal 3 are obtained.

Figure 9:
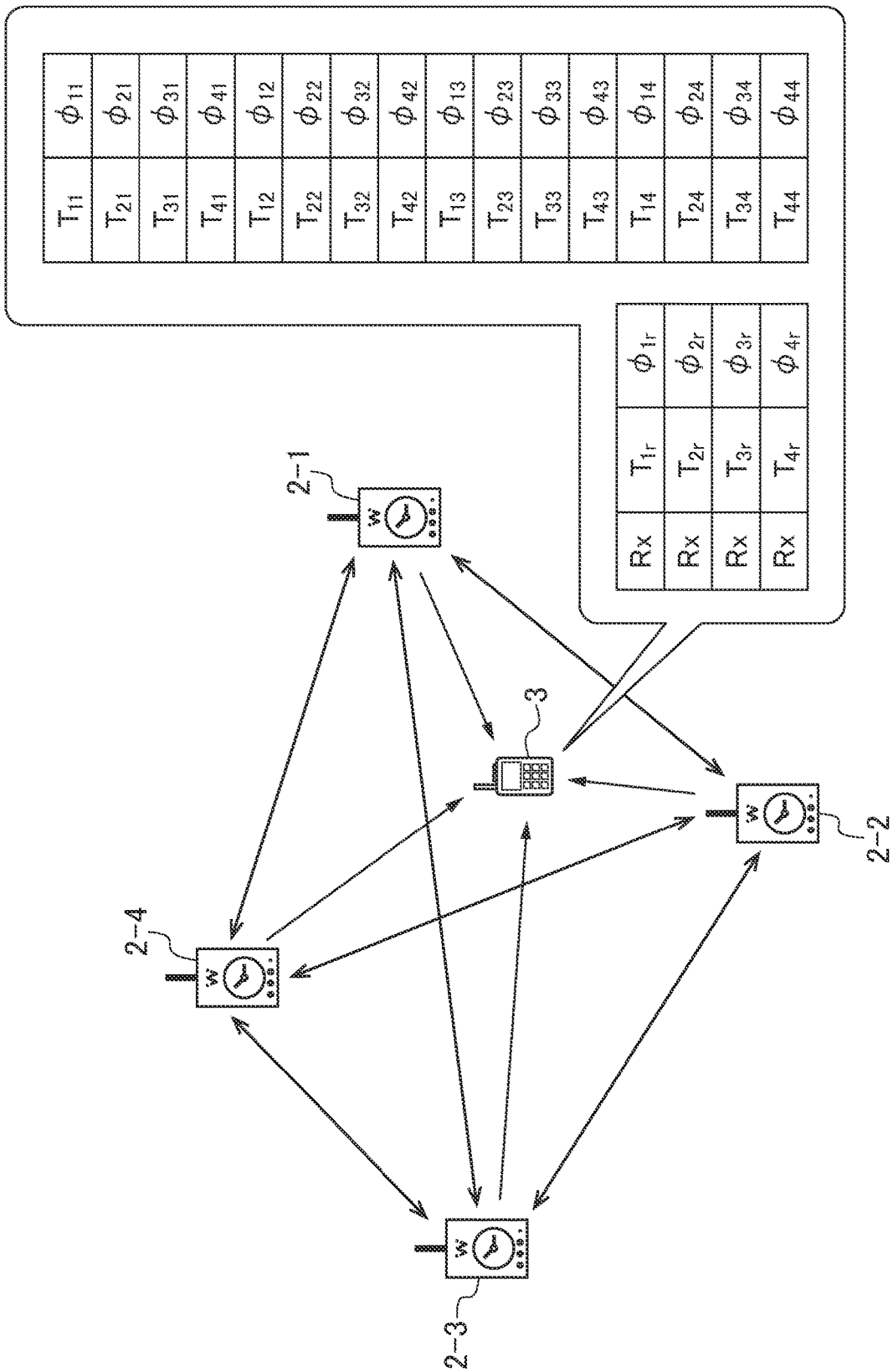
FIG. 9 is a diagram for describing a method for obtaining a location of the mobile terminal and a time error ΔT.

The mobile terminal 3 detects reception clock times $T_{Ar}$ at which the signals transmitted from the base stations 2-1 to 2-4 are received. The A in this reception clock time $T_{Ar}$ is the source, which identifies the respective base stations 2-1 to 2-4. "1" in the A indicates the base station 2-1, "2" in the A indicates the base station 2-2, "3" in the A indicates the base station 2-3, and "4" in the A indicates the base station 2-4. The r becomes the mobile terminal 3 that receives the signal. That is, the mobile terminal 3 obtains reception clock times $T_{1r}$, $T_{2r}$, $T_{3r}$, $T_{4r}$ of the signals from the base stations 2-1 to 2-4 to the mobile terminal 3, as indicated in FIG. 9. The mobile terminal 3 may also similarly obtain a reception phase $\varphi_{Ar}$, and reception phases $\varphi_{1r}$, $\varphi_{2r}$, $\varphi_{3r}$, $\varphi_{4r}$ of the signals from the base stations 2-1 to 2-4 to the mobile terminal 3 are obtained.

Regarding the reception clock times and the reception phases of the signals measured here, in relation to the signals received in a receiving unit 24 of the base station 2, the base station 2 first detects the reception clock time and the reception phase of the signal that has been transmitted by itself from a transmitting unit 22 and has been received in the receiving unit 24, and similarly detects the reception clock time and the reception phase of the signal that has been transmitted by the transmitting unit 32 of the mobile terminal 3. Regarding the signals received in the receiving unit 34 of the mobile terminal 3, the mobile terminal 3 first detects the reception clock time and the reception phase of the signal that has been transmitted by itself from the transmitting unit 32 and has been received in the receiving unit 34, and similarly detects the reception clock time and the reception phase of the signal transmitted by the transmitting unit 22 of the base station 2.

Based on the transmission clock time $T_{AA}$ and the reception clock time $T_{Ar}$ of the signals detected thus, a propagation time $T_{dAr}$ of the signals is obtained, or based on the transmission phase $\varphi_{AA}$ and the reception phase $\varphi_{Ar}$, the propagation time $T_{d4r}$ of the signals is obtained. The propagation time can be obtained from the following formulae (9), (10).

$$T_{d4r} = T_{4r} - T_{44} \quad (9)$$

$$T_{d4r} = Tp \times \{N + (\varphi_{4r} - \varphi_{44})/2\pi\} \quad (10)$$

Here, Tp is one cycle of the carrier wave frequency, N is an integer, and $\varphi$ is radian.

The N is based on the propagation time, given by equation (9). For example, when the carrier wave is provisionally 1 GHz, one cycle is 1 ns and suppose the propagation time is inferred from equation (9), as 123.1 ns, it may be assumed that N=123. In addition, in a case where the propagation time is not measured, there is a method of estimating the N based on a consistency of a result of propagation phase measurement using different carrier frequencies.

That is, based on the formula (9), a $T_{d1r}$ is obtained from the difference between the reception clock time $T_{1r}$ and the transmission clock time $T_{11}$ of the signal transmitted from the base station 2-1, a $T_{d2r}$ is obtained from the difference between the reception clock time $T_{2r}$ and the transmission clock time $T_{22}$ of the signal transmitted from the base station 2-2, a $T_{d3r}$ is obtained from the difference between the reception clock time $T_{3r}$ and the transmission clock time $T_{33}$ of the signal transmitted from the base station 2-3, and a $T_{d4r}$ is obtained from the difference between the reception clock time $T_{4r}$ and the transmission clock time $T_{44}$ of the signal transmitted from the base station 2-4. In a case based on the formula (10), the $T_{d4r}$ is obtained similarly. In such case, an additional N is required to be obtained. In such case, the reception clock time $T_{4r}$ is used, or a plurality of carrier wave phases are used.

After the respective $T_{d4r}$ ($T_{d1r}$, $T_{d2r}$, $T_{d3r}$, $T_{d4r}$) are obtained by transmitting a signal from the respective base stations 2-1 to 2-4 to the mobile terminal 3, the time error $\Delta$ and the coordinate (x, y, z) of the mobile terminal 3 are obtained based on the following formula (11).

$$c \times (T_{d4r} - \Delta)^2 = (X_k - x)^2 + (Y_k - y)^2 + (Z_k - z)^2 \quad (11)$$

Here, ($X_k$, $Y_k$, $Z_k$) indicates the coordinate of the base station 2. k is the number of the base stations 2-1 to 2-4. That is, the coordinate of the base station 2-1 is ($X_1$, $Y_1$, $Z_1$), the coordinate of the base station 2-2 is ($X_2$, $Y_2$, $Z_2$), the coordinate of the base station 2-3 is ($X_3$, $Y_3$, $Z_3$), and the coordinate of the base station 2-4 is ($X_4$, $Y_4$, $Z_4$).

Based on the coordinates ($X_k$, $Y_k$, $Z_k$) of the respective base stations 2 and the measured propagation times $T_{d4r}$, the time error $\Delta$ and the coordinate (x, y, z) of the mobile terminal 3 can be obtained from the formula (11). Here, since four or more of each of the formulas (11) are generated by four or more of the base stations 2 transmitting a signal to the mobile terminal 3, the time error $\Delta$ and the coordinate (x, y, z) of the mobile terminal 3 can be obtained. That is, this time error $\Delta$ and the coordinate (x, y, z) of the mobile terminal 3 can be obtained using a principle similar to that of the Global Navigation Satellite System (GNSS).

Note that, in order to perform these calculations, the respective base stations 2-1 to 2-4 may write the reception clock times and reception phases of the four signals that they have received themselves into a payload of a wireless communication packet in the signals to be transmitted, and transmit them to the mobile terminal 3. As a result, the mobile terminal 3 can receive a total of 16 samples of the reception clock times $T_{11}$ to $T_{44}$ and the reception phases $\varphi_{11}$ to $\varphi_{44}$ from the respective base stations 2-1 to 2-4 as indicated in FIG. 9. By obtaining the propagation times $T_{d(AB)}$ of the signals using the formula (1) to the formula (8) based on these reception clock times $T_{11}$ to $T_{44}$ and reception phases $\varphi_{11}$ to $\varphi_{44}$, the mobile terminal 3 can obtain the distances between the base stations 2-1 to 2-4. In addition, based on the above-described method, the coordinates of the base stations 2-1 to 2-4 can be obtained. As indicated in FIG. 9, since the mobile terminal 3 has obtained the reception clock times $T_{1r}$, $T_{2r}$, $T_{3r}$, $T_{4r}$, or the reception phases $\varphi_{1r}$, $\varphi_{2r}$, $\varphi_{3r}$, $\varphi_{4r}$ from the base stations 2-1 to 2-4, the mobile terminal 3 can also obtain its own coordinate (x, y, z) based on the formula (11) by detecting the $T_{d4r}$.

At this point, in order to reduce computational burden and cost on the mobile terminal 3 side, the base stations 2 side may each calculate their coordinate ($X_k$, $Y_k$, $Z_k$), write this into the payload of the wireless communication packet, and broadcast it. By simply receiving the coordinates ($X_k$, $Y_k$, $Z_k$) of the base stations 2 and measuring the $T_{d4r}$ by itself, the mobile terminal 3 can obtain the coordinate (x, y, z) based on the formula (11).

The calculation of the coordinate (x, y, z) of the mobile terminal 3 may be performed entirely on the base stations 2 side. In such case, the reception clock times and the reception phases of the four signals received by each of the base stations 2-1 to 2-4 themselves are shared in any of the base stations 2, and upon that, the coordinates of the respective base stations 2-1 to 2-4 are obtained. Subsequently, the $T_{d4r}$ detected by the mobile terminal 3 is transmitted to the shared base station 2, and the coordinate is calculated similarly.

Note that, as described above, in a case where the coordinates ($X_k$, $Y_k$, $Z_k$) of the base stations 2 are associated with the absolute coordinates based on the GNSS signals received from the satellite and a correction has been made based on this, the coordinate (x, y, z) of the mobile terminal 3 to be obtained can also be displayed in association with an absolute coordinate, and a correction can be made based on this.

The base station 2 or the mobile terminal 3 may perform clock-time synchronization or phase correction between the respective base stations 2-1 to 2-4 and the mobile terminal 3 based on the obtained time error $\Delta T$. Regarding this clock-time synchronization, it may be performed so as to adjust to the clock time of any base station 2 or the mobile terminal 3, an average of the times may be used, or other well-known synchronization methods may be employed.

Thus, according to the present invention having the above-described configuration, by obtaining the distances between the multiple base stations 2 using Wi-Wi, it becomes possible to achieve clock-time synchronization between the multiple base stations 2 using the least amount of radio wave resources. As a result, the mobile terminal 3 itself can also achieve clock-time synchronization and relative position measurement by simply receiving signals from the base stations 2. At this point, regardless of the number of the mobile terminals 3, the clock-time synchronization and the relative position measurement are achievable simply by receiving the signals broadcasted from the base stations 2.

Figure 10:
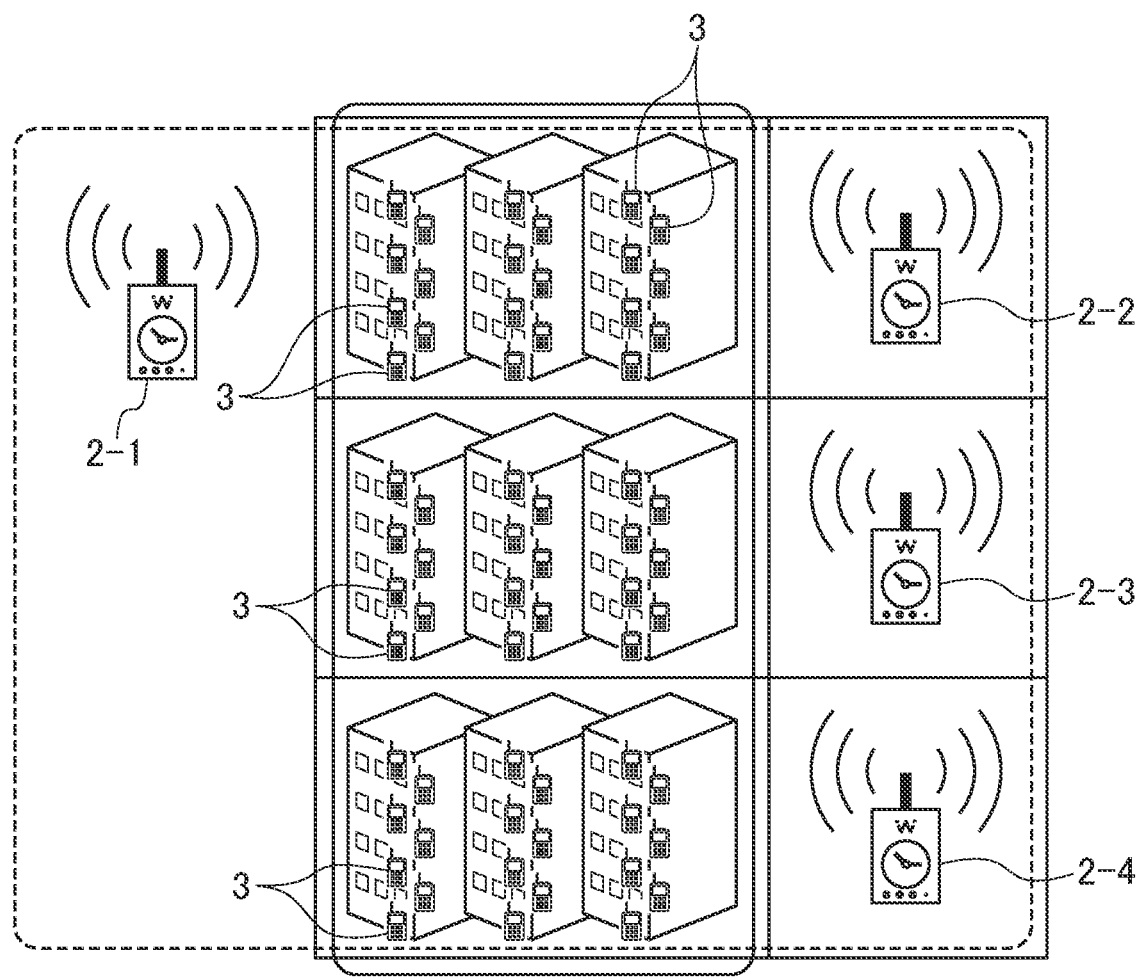
FIG. 10 is a diagram indicating an example in which in a case where a large number of the mobile terminals are densely gathered, measurement of relative positions of the respective mobile terminals is achieved.

FIG. 10 is a diagram indicating an example in which in a case where a large number of the mobile terminals are densely gathered, measurement of relative positions of the respective mobile terminals is achieved. In the wireless communication system 1 to which the present invention is applied, even when multiple mobile terminals 3 are densely gathered in a building, clock-time synchronization and relative position measurement are achievable simply by receiving the signals broadcasted by the base stations 2. Even in a case where a large number of the mobile terminals 3 are densely gathered, the clock-time synchronization and the relative position measurement can be achieved without taking special consideration of an interference between the mobile terminals 3 or having a signal being transmitted from the mobile terminal 3 side, which allows the power consumption of the entire system to be reduced.

What is claimed is:

1. A wireless communication system comprising:
a base station group constituted by four or more base stations that allow mutual wireless communication; and
a distance calculation unit,
wherein:
between one base station and another base station constituting the base station group, the one base station measures a reception clock time $T_{AA}$ of a signal transmitted by itself and a reception clock time $T_{BA}$ of a signal received from the other base station, and the other base station measures a reception clock time $T_{BB}$ of a signal transmitted by itself and a reception clock time $T_{AB}$ of a signal received from the one base station, and based on the reception clock time $T_{AA}$ and the reception clock time $T_{BA}$ measured by the one base station and the reception clock time $T_{BB}$ and the reception clock time $T_{AB}$ measured by the other base station, a propagation time between the base stations is obtained,
the distance calculation unit obtains distances between all the base stations constituting the base station group by multiplying each of the propagation times similarly obtained between all the base stations by a propagation velocity of the signals,
the wireless communication system further comprises:
a coordinate assigning unit that assumes a coordinate of one base station constituting the base station group to be an origin, has the coordinate of the one base station as a reference, and assigns a coordinate of another base station based on the distances between the base stations obtained by the distance calculation unit;
a reception clock time detection unit that detects reception clock times $T_{Ar}$ at which a mobile terminal receives signals transmitted from at least four base stations constituting the base station group;
a propagation time calculation unit that obtains a propagation time $T_{dAr}$ of a signal based on the transmission clock time $T_{AA}$ of the signal from each of the base stations and the reception clock time $T_{Ar}$ of the signal detected by the reception clock time detection unit for each of the base stations; and
a positioning unit that obtains a location of the mobile terminal and a time error $\Delta T$ based on the propagation time calculated for each of the base stations by the propagation time calculation unit and the coordinates of the respective base stations assigned by the coordinate assigning unit.

2. The wireless communication system according to claim 1, wherein the one base station further measures a reception phase $\varphi_{AA}$ of a signal transmitted by itself and a reception phase $\varphi_{BA}$ of a signal received from the other base station, and the other base station further measures a reception phase $\varphi_{BB}$ of a signal transmitted by itself and a reception phase $\varphi_{AB}$ of a signal received from the one base station, and based on the reception phase $\varphi_{AA}$ and the reception phase $\varphi_{BA}$ measured by the one base station and the reception phase $\varphi_{BB}$ and the reception phase $\varphi_{AB}$ measured by the other base station, the propagation time between the base stations is further obtained.

3. The wireless communication system according to claim 1, further comprising:
an absolute coordinate identification unit that identifies absolute coordinates of the respective base stations; and
a correction unit that corrects the coordinates of the respective base stations assigned by the coordinate assigning unit based on the absolute coordinates of the respective base stations identified by the absolute coordinate identification unit.

4. The wireless communication system according to claim 1, further comprising:
a clock-time synchronization unit that obtains a clock-time difference between the base stations based on the reception clock time $T_{AA}$ and the reception clock time $T_{BA}$ measured by the one base station and the reception clock time $T_{BB}$ and the reception clock time $T_{AB}$ measured by the other base station, and performs clock-time synchronization based on each of the clock-time differences similarly obtained between all the base stations constituting the base station group.

5. The wireless communication system according to claim 1, further comprising:
a clock-time synchronization unit that performs clock-time synchronization between the respective base stations and the mobile terminal based on the time error $\Delta T$ obtained by the positioning unit.

* * * * *